United States Patent [19] — Hanagan
[11] 4,011,488
[45] Mar. 8, 1977

[54] LINEAR FIELD CONTROL MOTOR

[75] Inventor: Michael W. Hanagan, Somers, Conn.
[73] Assignee: Corbin Gentry Inc., Somersville, Conn.
[22] Filed: Mar. 19, 1975
[21] Appl. No.: 560,176
[52] U.S. Cl. .............................. 318/139; 318/360; 310/191; 310/209
[51] Int. Cl.² .......................................... H02P 7/00
[58] Field of Search .......... 318/139, 214, 243, 360; 310/191, 209

[56] References Cited
UNITED STATES PATENTS

| 1,919,774 | 7/1933 | Chew | 318/243 |
| 2,915,254 | 12/1959 | Weber et al. | 318/243 X |
| 3,250,976 | 5/1966 | McEntire | 318/243 |
| 3,280,928 | 10/1966 | Roe | 318/243 X |

*Primary Examiner*—Gene Z. Rubinson

[57] ABSTRACT

A control system is provided which is particularly suited for employment for purposes of effecting control over the electric motor embodied in an electrically powered motor vehicle which is operable therein as the prime mover thereof. The control system of the present invention is capable of being utilized with all types of electric motors including direct current permanent magnet motors, direct current series wound motors, direct current series shunt motors, or any possible magnet and winding combination of direct current motor. Moreover, the control system of the present invention is further applicable for use with electrically powered motor vehicles that employ alternating current motors of any type such as for instance mutual induction and excited rotor motors. The control system includes a linear field control motor which has two main moving segments. The first of these comprises the armature or rotor which is the element that revolves and which in accord with conventional practice provides the mechanical force output from the motor. The other segment of the linear field control motor is the field or the stator which is movable linearly relative to the armature or rotor. More specifically, the armature or rotor of the linear field control motor can be referred to as the revolving field (RF) segment of the motor, i.e., the mechanical revolving field that is attached to the output shaft of the motor, while the field or stator of the linear field control motor is referred to as the linear field (LF) segment of the motor, i.e., the nonmechanical revolving field of the motor. The linear field segment includes a housing operable to hold the permanent magnets for field winding segments or the field windings. The linear field segment moves linear to the revolving field segment on support tracks, provided for this purpose, utilizing any one of various forms of linear bearings. The revolving field member is the common revolving member, but does not move in a linear relationship relative to the ends of the motor. The revolving field segments can be constructed so as to embody various forms of mechanically revolving fields.

10 Claims, 9 Drawing Figures

LINEAR FIELD CONTROL MOTOR

BACKGROUND OF THE INVENTION

In recent years, there has developed a noticeable upward trend in the number of people who are devoting a significant amount of time to recreational pursuits of one type or another. One of these recreational pursuits is that of motorcycling. The extent of interest which exists in motorcycling is clearly shown by the rapidly increasing number of registrations of this type of motor vehicle. There are a variety of ways in which motorcycles are being used. Namely, some people employ motorcycles merely as a recreational vehicle. Others are interested in participating in the various racing events for motorcycles which are held in large numbers particularly during the summer months in different portions of the country. In addition, many organizations which are involved in public safety such as police departments, etc. have purchased motorcycles for their own use as a means of assisting them to fulfill their assigned responsibilities. Finally, recently when the gasoline shortage became pronounced throughout this country, many people turned to motorcycles as an alternate mode of transportation to get to and from work, etc. because of the fact that motorcycles are noted for their economical fuel performance.

Concomitant with the rise in interest paid to motorcycles, there has been some attention given to making changes in the nature of the construction of the motorcycles. This has led to a proliferation of different types of motorcycles as well as to the many different models of each type which are presently being marketed. As a result, the potential purchaser of a motorcycle has practically an unlimited selection to choose from. In addition to the so-called original equipment manufacturers who manufacture and sell motorcycles as complete units, there also exists a number of other manufacturers who specialize in the manufacture only of different ones of the major components which are embodied in a motorcycle. The latter manufacturers offer their products to potential purchasers as components which can be substituted in the motorcycle for original equipment components provided therein. As a result of the availability of the latter type of products, a motorcycle owner by purchasing such equipment and embodying it in his motorcycle is capable often of changing almost completely the entire character of his motorcycle.

Notwithstanding the fact that some changes have been made in the construction of motorcycles here to date, by and large these changes have been in the nature of matters of appearance rather than in matters of structure. More specifically, apart from notable advances which have been made in recent years in the construction of motorcycle seats, little has changed heretofore in the basic design of motorcycles from a structural standpoint.

However, because of the continuing high price of gasoline and because internal combustion engines are known to produce exhaust products that are deleterious to the environment, there has been some interest exhibited in providing a motorcycle which would be powered by some means other than an internal combustion engine. In this regard, one such alternative power source for the conventional gasoline powered motorcycle is a motorcycle powered by electricity. To this end, there has now been produced and there is presently being commercially marketed an electric motorcycle which embodies an electric motor which in turn is connected in electrical circuit relation with a multiplicity of rechargeable storage batteries.

In providing an electrically powered motorcycle, there are a number of design considerations which must be borne in mind. Most notably, consideration must be given to providing means operable for purposes of effecting control over the operation of the aforementioned electric motor. More specifically, a need exists to be able to adjust the speed of the motorcycle. Also, there is a need to be able to adjust the rate of acceleration and deceleration thereof as well as to enable the motorcycle to cruise at any speed within the motorcycle's capability.

Heretofore, for purposes of effecting the desired control over the operation of the electric motor, contactors and solid-state devices have been utilized in an attempt to make the electrically powered motor vehicle function smoothly. However, the use of such devices in this connection has not proven to be entirely satisfactory. Namely, when components which are selected based on their cost are emloyed in the aforedescribed connection thereby providing a control system which may be characterized as an economical one, most commonly the result is found to be that the desired smoothness of operation is lacking, i.e., what may be referred to as a jolty electrical vehicle is provided. On the other hand, when sophisticated solid-state controls are used, the cost of providing the control system is relatively large and thus increases the price of the motor vehicle to such a high level as to price the motor vehicle out of the reach of most of the potential customers therefor.

Thus, notwithstanding the fact that there have existed control systems capable of being embodied in electrically powered motor vehicles, there has nevertheless been evidenced a need to provide a new and improved control means operable for effecting control over the electric motor of an electrically powered motor vehicle. More specifically, although a number of control systems have been provided heretofore, none of them have proven to be entirely satisfactory when placed in operation. By and large, this has been because such prior art forms of control systems when applied to electrically powered motor vehicles have been characterized by the fact that they either are incapable of providing the desired smoothness of operation or else they require the interpositioning of an unnecessary amount of control devices between the electrical motor and the batteries which provide the power thereto.

Accordingly, it is an object of the present invention to provide such a control system which obviates the necessity of utilizing a multiplicity of control devices interposed between the electric motor and the batteries, while yet being operable to effect good speed control for electrically powered motor vehicles.

It is another object of the present invention to provide such a control system which is particularly suited for employment for purposes of effecting control over the electric motor embodied in an electrically powered motor vehicle which is operable therein as the prime mover thereof.

A further object of the present invention is to provide such a control system which is characterized in that it is capable of being easily maintained and repaired by ordinarily trained electricians.

A still further object of the present invention is to provide such a control system which is readily capable of being economically mass produced by motor manufacturers without requiring any technical breakthroughs to be achieved by the latter in order to do so.

Yet an object of the present invention is to provide such a control system which is readily adapted through the performance of minor modifications thereto of being utilized in a variety of different applications.

Yet another object of the present invention is to provide such a control system which is relatively inexpensive to manufacture and therefore is effective to assist in maintaining the cost of manufacture of the electrically powered motor vehicle which embodies the subject control system at a relatively low level.

SUMMARY OF THE INVENTION

It has now been found that the foregoing and related objects can be readily attained in a control system which is particularly suited for employment for purposes of effecting control over the electric motor embodied in an electrically powered motor vehicle which is operable therein as the prime mover thereof. The control system of the present invention is capable of being utilized with all types of electric motors including both direct current motors and alternating current motors which are employable in electrically powered motor vehicles. In accord with the present invention, the control system includes a linear field control motor which has two main moving segments. The first of these comprises the armature or rotor which is the element that revolves and which in accord with conventional practice provides the mechanical force output from the motor. The other segment of the linear field control motor is the field or stator which is movable linearly relative to the armature or rotor. More specifically, the armature or rotor of the linear field control motor can be referred to as the revolving field (RF) segment of the motor, i.e., the mechanically revolving field that is attached to the output shaft of the motor, while the field or stator of the linear field control motor is referred to as the linear field (LF) segment of the motor, i.e., the nonmechanically revolving field of the motor. The linear field segment includes a housing operable to hold the permanent magnets for field winding segments or the field windings. The linear field segment moves linearly relative to the revolving field segment on support tracks, provided for this purpose, utilizing any one of various forms of linear bearings. The revolving field member is the common revolving member, but does not move in a linear relationship relative to the ends of the motor. The revolving field segments can be constructed so as to embody various forms of mechanically revolving fields.

In accord with the preferred embodiment of the invention, the linear field control motor has the revolving field segment thereof mounted on a suitably configured shaft so as to be rotatable therewith. The ends of the output shaft are suitably supported in a pair of end bells, being positioned so as to be located substantially at the center of the end bells. Moreover, a commutator is supported on one end of the aforesaid output shaft so as to be rotatable therewith. In known fashion, a pair of brush holders, each having a brush supported therein, are suitably mounted relative to the commutator so that the brushes engage the circumference of the commutator as the latter rotates. In addition, each of the brushes is connected in electrical circuit relation with the electrical power circuit for the electrically powered motor vehicle. The pair of spaced end bells also function as a support for a multiplicity of support tracks, i.e., slide rails which are preferably positioned so as to be located in equally spaced relation relative to each other. A housing of generally circular configuration is interposed between the circumference of the revolving field segment, i.e., the armature or rotor of the motor and the multiplicity of slide rails. More specifically, the aforesaid housing is provided with a hollow interior whereby the housing is capable of being moved relative to the revolving field segment between a first position wherein the housing encircles the circumference of the revolving field segment and a second position wherein the housing is located in nonsurrounding relation to the circumference of the revolving field segment. Moreover, the inner surface of the housing has affixed thereto permanent magnets suitably arranged so that the revolving field segment lies with the magnetic field produced by the permanent magnets. Around the outer circumference thereof, the housing is provided with a plurality of suitably arranged raised portions each of which houses a linear bearing. Moreover, the latter described linear bearings are suitably located relative to each other so as to be arranged in a multiplicity of pairs. Each pair of linear bearings in turn functions to receive therewithin one of the slide rails whereby each pair of linear bearings is capable of being slid along the length of the corresponding slide rail thereby enabling the housing with the permanent magnets fixed thereto which taken together form the linear field segment to be moved between the aforedescribed first and second positions of the housing. In addition, one pair of axially aligned raised portions formed on the exterior of the housing which house linear bearings therein has an outwardly extending block supported thereon. One of the latter blocks has one end of an air compressor fastened thereto in mounted relation thereon. The other one of the aforereferenced pair of blocks functions as a support for one end of the throttle cable of the electrically powered motor vehicle. A third support block is suitably fastened to one of the pair of end bells so as to be aligned axially with the aforesaid other pair of blocks. The third support block has mounted thereto the other end of the aforementioned air compressor. In addition, the third support block has a suitably configured opening formed therein through which a portion of the throttle cable located intermediate the ends thereof passes. The other end of the throttle cable is supported in a suitably located position so as to be located in relatively easy reach of the operator of the electrically powered motor vehicle.

DETAILED DESCRIPTION OF THE ILLUSTRATED EMBODIMENT

Figure 1:
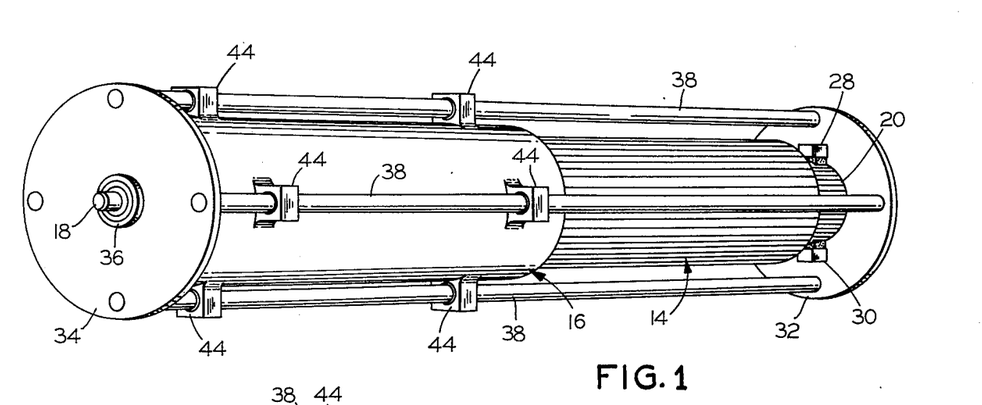
FIG. 1 is a perspective view of a linear field control motor constructed in accordance with the present invention.
Figure 2:
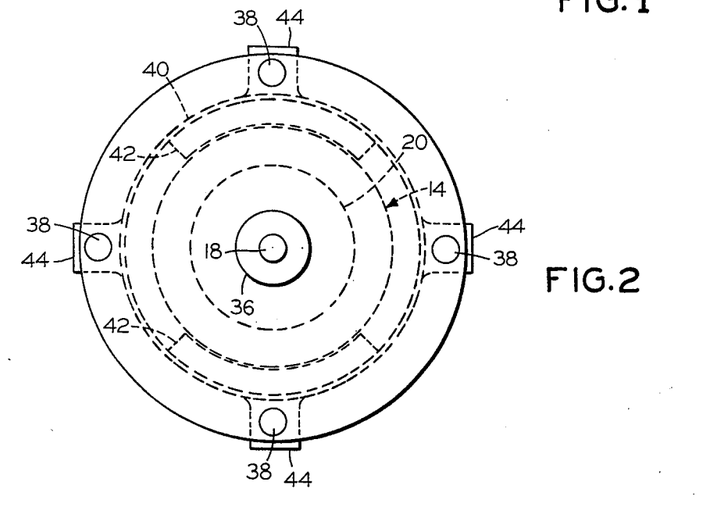
FIG. 2 is an end elevational view of a linear field control motor constructed in accordance with the present invention.
Figure 8:
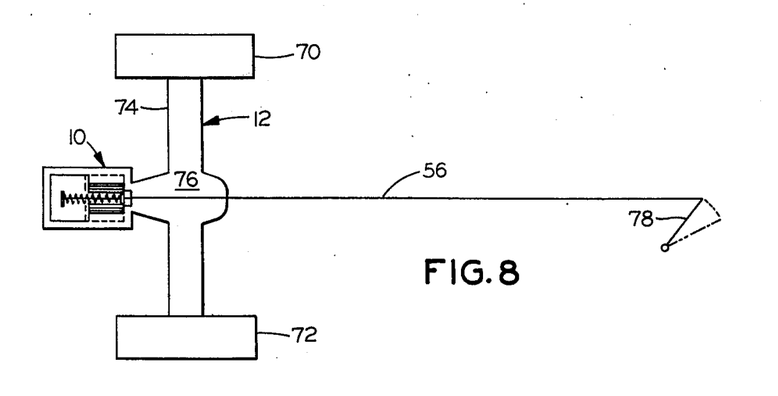
FIG. 8 is a schematic diagram of a portion of an electrically powered motor vehicle embodying a linear field control motor constructed in accordance with the present invention, illustrating the manner in which the linear field control motor is supported within the electrically powered motor vehicle.

Referring now to the drawings and more particularly FIG. 1 thereof, there is illustrated therein a control system comprising a linear field control motor, generally designated by reference numeral 10, constructed in accordance with the present invention. The linear field control motor 10 is particularly suited for employment in an electrically powered motor vehicle 12, a portion of one of which is schematically depicted in FIG. 8 of the drawings, for purposes of effecting control over the electric motor which is operative as the prime mover for the motor vehicle 12. Moreover, the principle of operation of the linear field control motor 10 is such that it is capable of being utilized with all types of electric motors including direct current permanent magnet motors, direct current series wound motors, direct current series shunt motors, or any possible magnet and winding combination of direct current motor. In addition, the principle of operation thereof is also applicable for use with alternating current motors of the type employed in electrically powered motor vehicles such as for instance mutual induction and excited rotor motors.

Figure 3:
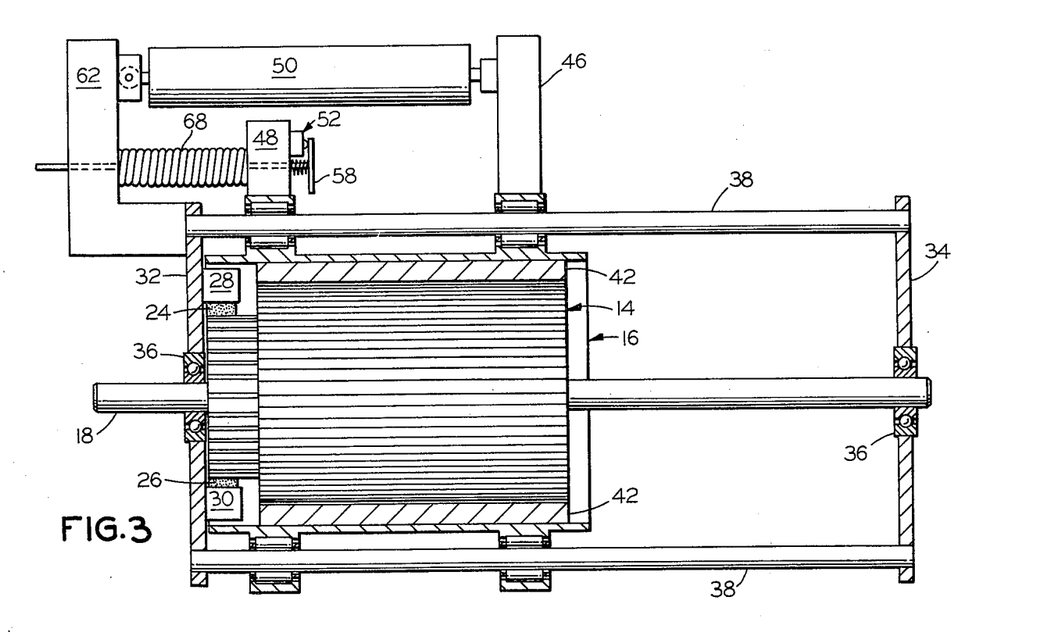
FIG. 3 is a side elevational view of a linear field control motor constructed in accordance with the present invention illustrating the linear field segment of the motor occupying a first position relative to the revolving field segment of the motor corresponding to the operating condition of the motor wherein maximum torque, maximum speed and maximum horsepower is produced by the motor.
Figure 4:
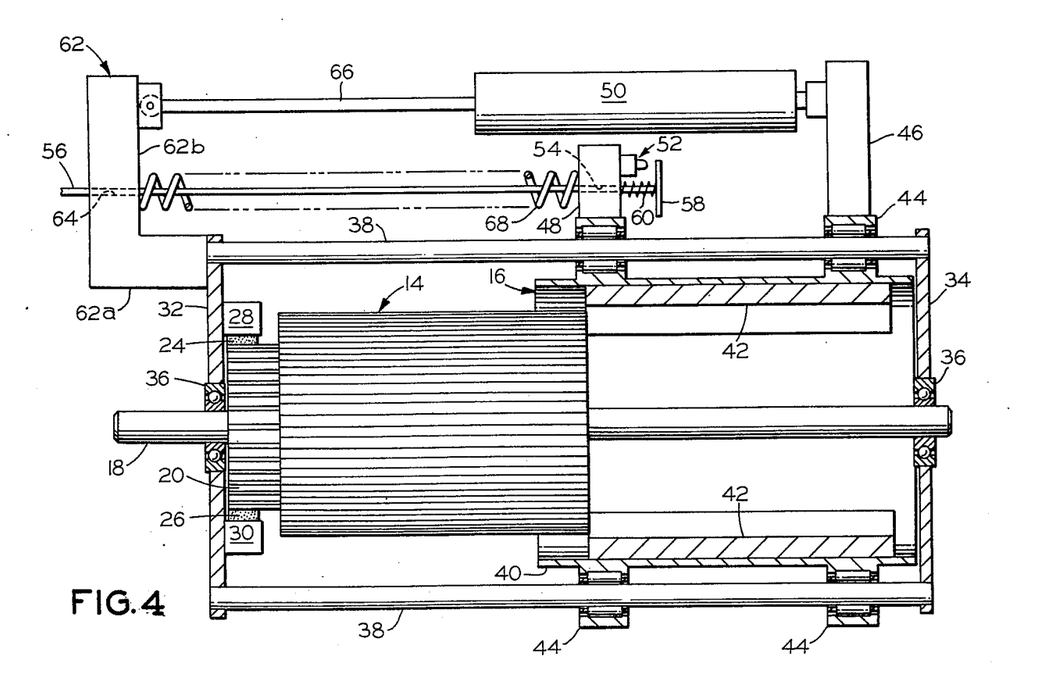
FIG. 4 is a side elevational view of a linear field control motor constructed in accordance with the present invention illustrating the linear field segment of the motor occupying a second position relative to the revolving field segment of the motor corresponding to the operating condition of the motor wherein minimum horsepower is produced by the motor.

Referring now to FIGS. 3 and 4 of the drawings, as best understood with reference thereto the linear field control motor 10 has two main moving segments. The first of these comprises the armature or rotor 14 which is the element that revolves and which in accord with conventional practice provides the mechanical force ouput from the motor 10. The armature or rotor 14 of the linear field control motor 10 may also be referred to as the revolving field (RF) segment of the motor 10. With further reference to FIGS. 3 and 4 of the drawings, the armature or rotor, i.e., the revolving member 14 depicted therein in accord with conventional practice consists of an iron core around which wires are suitably wound. More specifically, the circumference of the revolving member 14 has a multiplicity of elongated longitudinally extending slots formed therein at suitably spaced intervals around the entire circumference of the revolving member 14. The aforereferenced wires are suitably positioned in each of the aforedescribed slots. Inasmuch as the revolving member 14 embodies a conventional construction, it has not been deemed necessary to include herein a further description of the nature of the structure thereof. Rather, the brief description found set forth hereinafter of the revolving member 14 and the mode of operation thereof is believed adequate for purposes of providing one skilled in the art with an understanding thereof.

The other main moving segment of the linear control motor 10 is the field or stator 16 which as will be described more fully subsequently is movable linearly relative to the revolving member 14. As such, the field or stator 16 may be referred to as the linear field (LF) segment of the linear field control motor 10, i.e., the nonmechanically revolving field of the motor 10.

Returning now to a consideration of the revolving field (RF) segment of the linear field control motor 10, the revolving member 14 is suitably mounted by means of any conventionally employed mounting means on an elongated shaft 18. The revolving member 14 is suitably mounted on the shaft 18 intermediate the ends thereof so as to rotate therewith. In closely spaced relation to the revolving member 14 and so as to be located outwardly thereof, there is also suitably mounted on the shaft 18 adjacent one end thereof, a commutator 20 which is of conventional construction. In view of the conventional nature of the commutator 20 it is not deemed necessary to describe in detail herein the nature of the construction of the commutator 20 for one skilled in the art to obtain an understanding of the construction and the mode of operation of the linear field control motor 10 which forms the subject matter of the present invention.

As best understood with reference to FIGS. 3 and 4 of the drawings, a pair of brushes 24 and 26, each suitably supported in a corresponding brush holder 28 and 30, respectively, are cooperatively associated with the commutator 20. The brushes 24 and 26 are each of conventional construction. More specifically, as will be understood by those skilled in the art, each of the brushes 24 and 26 comprises an electrical conductor. The brushes 24 and 26 as illustrated in FIGS. 3 and 4 of the drawings are suitably located relative to the circumference of the commutator 20 so as to be located adjacent to the circumference of the latter and on opposite sides thereof. Namely, the brushes 24 and 26 are supported by the brush holders 28 and 30 in such a manner as to be located substantially 180° apart around the circumference of the commutator 20 and so as to be in sliding contact with the circumference of the commutator 20.

Continuing with a description of the nature of the construction of the linear field control motor 10, as most readily apparent from FIG. 1 of the drawings, the linear field control motor 10 includes a pair of end bells 32 and 34. Each of the end bells 32 and 34 resembles a wheel in appearance. Namely, each of the end bells 32 and 34 includes a generally circular rim, a hub and a multiplicity of spoke-like members which serve to interconnect the rim and the hub. The aforesaid multiplicity of spoke-like members have been omitted from FIG. 1 in the interest of maintaining clarity of illustration of the other elements of the linear field control motor 10 appearing therein. In a manner now to be described, the end bells 32 and 34 each perform a supporting function. More specifically, referring again to FIGS. 3 and 4 of the drawings, the brush holders 28 and 30 are preferably attached through the use of any suitable conventional form of fastening means to the output face of the end bell 32. In addition, the corresponding hub of each of the end bells 32 and 34 preferably has a shaft bearing 36 mounted internally thereof. Moreover, the opposite ends of the output shaft 18 are supported internally of the shaft bearings 36 so as to permit in accord with conventional practice the output shaft 18 to rotate relative to the end bells 32 and 34. The final function performed by the end bells 32 and 34 is that of support for a multiplicity of support tracks, i.e., elongated slide rails 38, the function of which will be described subsequently hereinafter.

Turning now to a more detailed description of the linear field (LF) segment of the linear field control motor 10, reference will be had for this purpose primarily to FIGS. 3 and 4 of the drawings. As illustrated in the latter figures, the linear field (LF) segment consists of a field or stator 16, i.e., a linearly movable member. The latter linearly movable member 16 includes a generally cylindrical-shaped shell which is operable as a housing 40. The shell or housing 40 has attached to the inner surface thereof a plurality of permanent magnets 42. Any suitable conventional form of fastening means (not shown) may be employed for purposes of retaining the permanent magnets 42 in engagement with the inner surface of the housing 40. The aforedescribed permanent magnets 42 are suitably arranged relative to each other on the inner surface of the housing 40 so as to be operable to produce a magnetic field which is capable of encompassing the revolving member 14 therewithin in a manner yet to be described. At spaced intervals around the circumference of the housing 40, there are provided a multiplicity of raised portions 44. The latter multiplicity of raised portions 44 are arranged in pairs, with each of the two raised portions 44 of each pair thereof being aligned axially relative to each other. Each of the raised portions 44 has a hollow interior in which there is suitably retained a linear bearing (not shown). In a manner to which further reference will be had hereinafter, each of the aforereferenced linear bearings (not shown) functions as a bearing support for a portion of a corresponding one of the slide rails 38, thereby enabling the housing 40 and more particularly the linear field (LF) segment to be slid relative to the revolving member 14.

By virtue of the construction described in the preceding paragraph, the linearly movable member 16 is capable of being moved relative to the revolving member 14 between a first position wherein the linearly movable member 16 encircles the revolving member 14 and a second position wherein the linearly movable member 16 is located in nonsurrounding relation to the revolving member 14. In addition, it is of course to be understood that the linearly movable member 16 may also be positioned relative to the revolving member 14 so as to partially encircle the latter, i.e., in a position which lies intermediate the aforedescribed first and second positions of the linearly movable member 16. In this connection, it is to be understood that the housing 40 is suitably dimensioned so as to be capable of being interposed between the circumference of the revolving member 14 and the multiplicity of slide rails 38. To this end, the external diameter of the housing 40 is selected so as to be slightly less than the diameter of the opening formed by the multiplicity of slide rails 38, i.e., the opening existing between the multiplicity of slide rails 38, while the internal diameter of the housing 40 measured from the inner surface of the permanent magnets 42 is selected so as to be greater than the external diameter of the revolving member 14.

Figure 5:
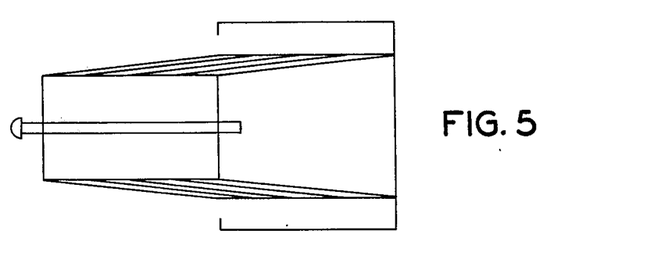
FIG. 5 is a schematic diagram of the theoretical magnetic lines of flux produced by the linear field segment of a linear field control motor constructed in accordance with the present invention when the linear field segment occupies the second position thereof relative to the revolving field segment of the motor as illustrated in FIG. 4.
Figure 6:
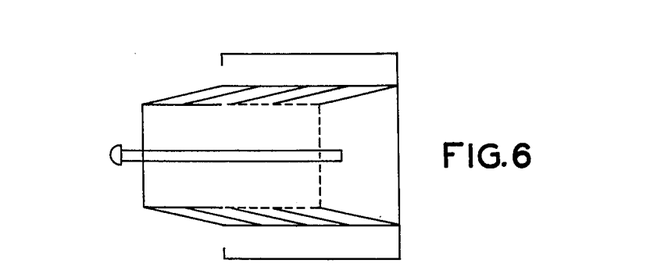
FIG. 6 is a schematic diagram of the theoretical magnetic lines of flux produced by the linear field segment of a linear field control motor constructed in accordance with the present invention when the linear field segment occupies a position relative to the revolving field segment of the motor which lies intermediate the first position thereof as illustrated in FIG. 3 and the second position thereof as illustrated in FIG. 4.
Figure 7:
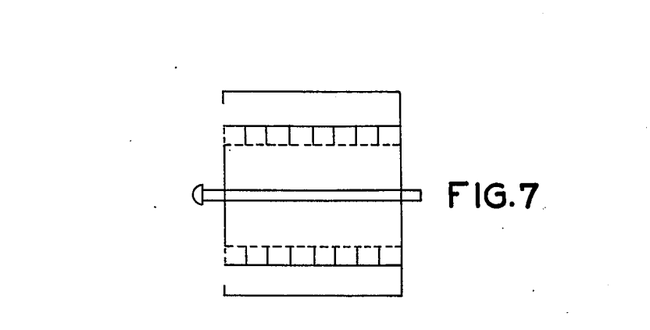
FIG. 7 is a schematic diagram of the theoretical magnetic lines of flux produced by the linear field segment of a linear field control motor constructed in accordance with the present invention when the linear field segment occupies the first position thereof relative to the revolving field segment of the motor as illustrated in FIG. 3.

Referring to FIGS. 5, 6 and 7 of the drawings, there is depicted therein a schematic representation of the magnetic lines of flux produced by the linear field (LF) segment of the linear field control motor 10 when the linearly movable member 16 occupies different positions relative to the revolving member 14. More specifically, FIG. 5 contains a schematic representation of the magnetic lines of flux as they theoretically exist when the linear field (LF) segment is positioned relative to the revolving member 14 in the manner illustrated in FIG. 4 of the drawings, i.e., when the linearly movable member 16 occupies the position thereof described in the preceding paragraph as the second position thereof. The latter second position of the linearly movable member 16 relative to the revolving member 14 corresponds to the full open position of the linear field control motor 10. As will be readily apparent from a reference to FIG. 5, when the linearly movable member 16 occupies the second position thereof, the magnetic lines of flux are of the longest length and therefore the infuence of the revolving field (RF) segment and the linear field (LF) segment is weakest. Consequently, the linear field control motor 10 operates to produce minimum horsepower. In contrast, when the linearly movable member 16 occupies the first position thereof relative to the revolving member 14 as defined in the preceding paragraph, the magnetic lines of flux as illustrated in FIG. 7 of the drawings are of the shortest length possible. Namely, the influence of the revolving field (RF) segment and the linear field (LF) segment is such as to cause maximum torque and speed, and maximum horsepower to be produced by the linear field control motor 10. FIG. 6 depicts a schematic representation of the theoretical magnetic lines of flux as they exist when the linearly movable member 16 occupies a position relative to the revolving member 14 which lies midway between the aforedescribed first and second positions of the linearly movable member 16. With the linearly movable member 16 located in the midrange position thereof, the magnetic lines of flux are of lesser length than the magnetic lines of flux illustrated in FIG. 5 when the linearly movable member 16 is in the second position thereof and greater than the magnetic lines of flux shown in FIG. 7 when the linearly movable member 16 is in the first position thereof. Consequently, with the linearly movable member 16 located in the midrange position thereof, the linear field control motor 10 operates at substantially half torque and half speed to provide an output equivalent to approximately one half of the maximum horsepower output of the motor 10.

Although a variety of different means are capable of being utilized for purposes of effecting the movement of the linearly movable member 16 relative to the revolving member 14, the preferred form of means employed for this purpose will now be described. Referring in this connection to FIGS. 3 and 4 of the drawings, as illustrated therein as each of one pair of the axially aligned raised portions 44 is provided with an outwardly extending support block 46 and 48, respectively. The support blocks 46 and 48 are of differing lengths with the longer thereof being supported on the outermost one of the two raised portions 44 of the given pair thereof. The support blocks 46 and 48 may take the form of separate members which are mounted through the use of conventional fastening means so that the major axis of each of the support blocks 46 and 48 extends substantially at right angles to the major axis of the housing 40, or the support blocks 46 and 48 may be formed integrally with the aforereferenced raised portions 44 of the given pair thereof. The support block 46 functions as a mounting means for one end of an air compressor 50. The function of the air compressor 50 will be set forth hereinafter in connection with the description of the mode of operation of the linear field control motor 10. The other support block 48, which is of lesser length than the support block 46 in order to fit within the space defined by the air compressor 50 and the slide rail 38 which is in closest proximity to the air compressor 50, functions as a support for a number of components which are included within the throttle means for the electrically powered motor vehicle 12. More specifically, the support block 48 has mounted thereon the throttle button 52. In addition, the support block 48 has a suitably dimensioned opening 54 formed therethrough through which the throttle shaft 56 passes. Fastened to one end of the throttle shaft 56 so as to be movable into and out of engagement with the throttle button 52 is a member 58 of generally circular configuration. Moreover, a coil spring 60 is preferably supported on the throttle shaft 56 so as to have one end thereof bearing against the member 58 and the other end thereof bearing against the support block 48. The coil spring 60 functions to apply a biasing force to the member 58 tending to bias the member 58 out of engagement with the throttle button 52.

Continuing with a description of the means through which linear movement is imparted to the linear field (LF) segment of the linear field control motor 10, there is provided in this connection in accord with the preferred embodiment of the invention a third support block 62. The latter support block 62 is substantially L-shaped in configuration with the latter configuration being provided by a relatively short leg portion 62a which is joined to a relatively long leg portion 62b so as to form substantially a right angle therebetween. In this connection, the leg portions 62a and 62b may take the form of separate members which are fastened together through the use of any conventional form of fastening means that is commonly found employed for purposes of fastening two members together. On the other hand, if so desired the leg portions 62a and 62b may be of unitary construction. As best understood with reference to FIGS. 3 and 4 of the drawings, the free end of the leg portion 62a of the support block 62 is suitably attached to the outer surface of the end bell 32 in spaced relation to the brush holder 28. For purposes of fastening the leg portion 62a to the end bell 32, any conventional form of fastening means such as threaded fasteners, etc. may be utilized. With further reference to FIGS. 3 and 4 of the drawings, the other leg portion, i.e., leg portion 62b of the support block 62 has an opening 64 formed therethrough through which the throttle cable 56 passes. In addition, the leg portion 62b of the support block 62 functions as a mounting means for the other end of the air compressor 50, and more particularly for the piston member 66 which is supported for movement within the air compressor 50. Although not shown in the drawings in the interest of maintaining clarity of illustration therein, it is to be understood that the aforedescribed mounting of the other end of the air compressor 50 to the leg portion 62b of the support block 62 is effected through the use of any suitable form of conventional fastening means. Finally, as shown in FIGS. 3 and 4 a coil spring 68 is provided for a purpose yet to be described in surrounding relation to the throttle cable 56 so as to have one end thereof seated against a surface of the support block 48 and the other end thereof seated against the surface of the leg portion 62b of the support block 62. The coil spring 68 is operable to provide a biasing force tending to bias apart the support blocks 48 and 62.

Turning now to a consideration of FIG. 8 of the drawings, there is depicted therein schematically a portion of an electrically powered motor vehicle 12 embodying a linear field control motor 10 constructed in accordance with the present invention. As shown in FIG. 8, the electrically powered motor vehicle 12 includes a pair of rear wheels 70 and 72. The latter rear wheels 70 and 72 in well-known fashion are interconnected by a rear axle 74 which in turn is operatively connected to a transmission 76 from which the rear axle 74 and thereby the rear wheels 70 and 72 are drivingly powered. The transmission 76 in turn is operatively connected to the output shaft 18 of the linear field control motor 10 so as to derive its power therefrom. In addition, there is found illustrated in FIG. 8 of the drawings the throttle cable 56 which as has been described previously hereinabove has one end thereof which is passed through the support blocks 62 and 48, and which has fastened to the aforesaid one end thereof a member 58. The member 58 performs a dual function, one of which is to hold the aforereferenced one end of the throttle cable 56 captive relative to the support block 48. As shown in FIG. 8 of the drawings, the other end of the throttle cable 56 is preferably operatively connected to the throttle pedal 78 of the electrically powered motor vehicle 12. It is of course to be understood that in accord with conventional practice the throttle pedal 78 is suitably located within the interior of the motor vehicle 12 so as to be readily accessible for operation thereof by the operator of the electrically powered motor vehicle 12.

Figure 9:
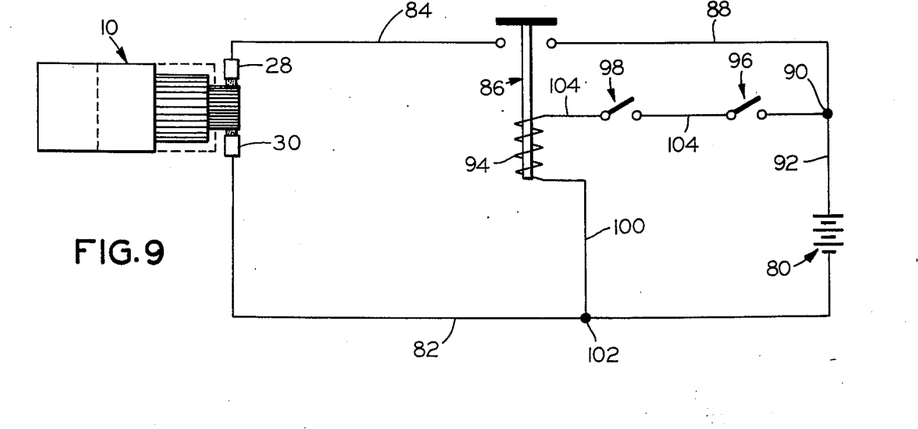
FIG. 9 is a schematic circuit diagram of an electrical power circuit for an electrically powered motor vehicle embodying a linear field control motor constructed in accordance with the present invention.

In FIG. 9 of the drawings, there is illustrated an electrical power circuit for an electrically powered motor vehicle 12 embodying a linear field control motor 10 constructed in accordance with the present invention. As depicted in FIG. 9 of the drawings, the linear field control motor 10 is connected across the terminals of the battery means 80. The latter battery means 80 may consist of one or more rechargeable storage batteries. More specifically, conductor 82 functions to electrically interconnect the brush 26 of the linear field control motor 10 with one of the terminals of the battery means 80. The other brush, i.e., brush 24 of the linear field control motor 10 is connected in electrical circuit relation by means of conductor 84 to one side of the main contactor, generally designated in FIG. 9 of the drawings by means of reference numeral 86. The other side of the main contactor 86 in turn is connected electrically by conductor 88 to junction 90 and therethrough by conductor 92 to the other terminal of the battery means 80. As shown in FIG. 9 of the drawings, the subject electrical power circuit further includes the coil 94 of the main contactor 86, an ignition key switch 96 and an energizing switch 98. More particularly, one side of the coil 94 of the main contactor 86 is connected electrically by means of conductor 100 to junction 102 and therethrough by conductor 82 to one terminal of the battery means 80. The other side of the coil 94 of the main contactor 86 is connected in series circuit relation by means of conductor 104 to the energizing switch 98 and the ignition key switch 96 to the junction 90 and therethrough by means of conductor 92 to the other terminal of the battery means 80.

Utilizing the electrical power circuit of FIG. 9 by way of illustration, there will now be set forth a description of the mode of operation of the linear field control motor 10 constructed in accordance with the present invention. For purposes of the following description, it will be assumed that when the linear field control motor 10 is in an OFF condition, the linear field (LF) segment occupies the second position thereof relative to the revolving field (RF) segment, i.e., the linear field (LF) segment and the revolving field (RF) segment bear the relationship relative to each other which is depicted in FIG. 4 of the drawings. In addition, it will be understood that the throttle cable 56 by virtue of being operatively connected to the housing 40 in the manner which has been previously described hereinabove is operable to cause the linear field (LF) segment to move from the second position thereof to the first position thereof, i.e., the position thereof depicted in FIG. 3 of the drawings relative to the revolving field (RF) segment. Finally, it should be understood that in the OFF condition of the electrical power circuit illustrated in FIG. 9 of the drawings, the ignition key switch 96, the energizing switch 98 and the main contactor 86 are each in a normally open condition. Thus, to start the electrically powered motor vehicle 12, a conventional key is inserted into the ignition key switch 96 and turned therein so as to cause the ignition key switch 96 to move to a closed circuit condition. The latter operation is performed in the same manner as is done with all key-operated ignition switches with which motor vehicles are commonly provided. Next pressure is applied slightly to the throttle pedal 78 by the operator of the electrically powered motor vehicle 12 in order to effect a closing of the energizing switch 98. This causes the main power contactor 86 to also close, thereby completing the electrical circuit between the battery means 80 and the linear field control motor 10 so as to cause electrical power to be supplied to the linear field control motor 10 from the battery means 80. With the throttle pedal 78 depressed slightly, the linear field (LF) segment under the influence of the biasing coil spring 68 occupies the second position thereof, i.e., the position depicted in FIG. 4 of the drawings relative to the revolving field (RF) segment. Consequently, the linear field (LF) segment is located at a position of maximum distance relative to the revolving field (RF) segment, and therefore the position wherein the linear field (LF) segment exerts the weakest magnetic influence on the revolving field (RF) segment. As such, the linear field control motor 10 operates to produce very low torque. Assuming now that the operator of the electrically powered motor vehicle 12 desires to cause the electrically powered motor vehicle 12 to accelerate, the former applies more pressure to the throttle pedal 78 causing the latter to depress further. The effect of the latter is to cause the linear field (LF) segment by virtue of the operative connection between the throttle pedal 78 and the housing 40 to move to a position wherein the linear field (LF) segment encircles more of the revolving field (RF) segment. This in turn causes a shortening of the magnetic lines of flux, i.e., causes the linear field (LF) segment to exert greater magnetic influence on the revolving field (RF) segment and therefore the linear field control motor 10 to produce more torque, and concomitantly causing the electrically powered motor vehicle 12 to move at a greater speed. Finally, when the linear field (LF) segment is moved through operation of the throttle pedal 78, i.e., by the further depressing of the throttle pedal 78 to the first position thereof as shown in FIG. 3 of the drawings wherein the linear field (LF) segment completely encircles the revolving field (RF) segment, the linear field control motor 10 functions to produce maximum output power. Namely, the linear field control motor 10 functions to transmit maximum power to the drive wheels 70 and 72 of the electrically powered motor vehicle 12.

When the operator of the electrically powered motor vehicle 12 wishes to decelerate, the former simply takes his foot off the throttle pedal 78. The effect thereof is to cause the energizing switch 98 to move to its normally open condition. With the energizing switch 98 in an open condition, the main power contactor 96 also moves to a normally open condition by virtue of the deenergizing of the coil 94 of the main contactor 86 which occurs as a result of the opening of the energizing switch 98. In addition, with the pressure being removed from the throttle pedal 78, the coil spring 68 operates to cause the linear field (LF) segment to return to its second position as shown in FIG. 4 of the drawings, i.e., to its furthest linear position in relation to the revolving field (RF) segment.

On the other hand, when the operator of the electrically powered motor vehicle 12 chooses to operate the electrically powered motor vehicle 12 at an interim speed, i.e., at a speed somewhere between stopped and full, the linear field control motor 10 with the throttle position control starts and continues to cycle ON and OFF the applied power in accord with the following mode of operation. For instance, with the ignition key switch 96 having been caused to move to its closed circuit position, the operator of the electrically powered motor vehicle 12 steps on the throttle pedal 78. The latter action as noted previously hereinabove is effective to cause the energizing switch 98 to close and thereafter also the main contactor 86 closes. As such electrical power is supplied to the linear field control motor 10 from the battery means 80. Assuming for the moment that the throttle pedal 78 is fully depressed, then the linear field (LF) segment will be moved to the first position thereof, the position depicted in FIG. 3 of the drawings wherein the linear field (LF) segment fully encircles the revolving field (RF) segment. However, if only sufficient foot power is applied to the throttle pedal 78 to cause the latter to occupy a mid-range position, then the linear movement of the linear field (LF) segment will be stopped at some point whereat the linear field (LF) segment is located intermediate the first and second positions of the latter. Namely, the travel of the linear field (LF) segment is stopped when the former goes a short distance from the throttle end piece, i.e., the support block 48 moves a short distance from the member 58. As a result, the energizing switch 98 opens followed by the opening of the main contactor 86. With the opening of the main contactor 86, the linear field control motor 10 is deenergized, i.e., an open circuit condition exists by virtue of the open state of the main contactor 86 between the linear field control motor 10 and the battery means 80. Therefore, the linear field (LF) segment under the influence of the biasing force being provided by the coil spring 68 begins to move toward the second position thereof, i.e., the OFF condition of the linear field control motor 10. If the throttle pedal 78 is maintained in a midrange position, the linear field (LF) segment in moving towards the second position thereof relative to the revolving field (RF) segment moves a sufficient distance to the right as viewed with reference to FIGS. 3 and 4 to cause the throttle button 52 which in turn is operatively connected in electrical circuit relation with the energizing switch 98 to move up against the throttle control end member, i.e., the member 58 whereby to cause the throttle button 52 to be actuated through its engagement with the member 58. Upon the actuation of the throttle button 52, the energizing switch 98 once again moves to a closed circuit condition. As a result, the coil 94 of the main contactor 86 becomes energized which in turn causes the movable member of the main contactor 86 to be pulled in, i.e., moved to its closed circuit condition and the linear field control motor 10 once again is reenergized. The aforedescribed cycle continues until the position of the throttle pedal 78 is changed as a result of action taken by the operator of the electrically powered motor vehicle 12. From the above description of the mode of operation of the linear field control motor 10, it can be seen that the former embodies a capability of providing good quality control over the running of the electrically powered motor vehicle 12. More specifically, the control system of the present invention functions in the manner of an interim speed control by automatically energizing and deenergizing the linear field control motor 10 by closing and opening automatically the electrical circuit between the linear field control motor 10 and the battery means 80 at any point and at any torque characteristic in the adjustable range of the linear field control motor 10. The function of the air compressor 50 which is employed in the preferred form of the invention is for effecting suppression of the speed of movement of the linear field (LF) segment, thereby aiding in achieving smooth operation of interim power cycle.

Although only one embodiment of a linear field control motor constructed in accordance with the present invention, which is particularly adapted for employment in an electrically powered motor vehicle has been shown in the drawings and described hereinabove, it is nevertheless to be understood that modifications in the construction thereof may be made thereto by those skilled in the art without departing from the essence of the invention. In this connection, some of the modifications which can be made in the linear field control motor 10 have been alluded to hereinabove while others will become readily apparent to those skilled in the art when exposed to the present description and illustration of the construction of the linear field control motor 10. For instance, although the linear field control motor 10 has been described hereinabove and illustrated in the drawings as employing a permanent magnet outside field with a wire wound direct current rotating field, the principle of operation of the linear field control motor constructed in accordance with the present invention is equally applicable to all types of electric motors. Namely, the concept of the invention is intended to apply to alternating current electric motors as well as direct current electric motors. In addition, notwithstanding the fact that the linear field control motor of the present invention has been described hereinabove as being embodied in an electrically powered motor vehicle, i.e., is particularly suited for employment in electrically powered motor vehicles because it is capable of overcoming the difficulties which have been encountered in employing prior art forms of control systems in such motor vehicles, it is nevertheless to be understood that the linear field control motor constructed in accordance with the present invention is also capable of being employed in many other types of applications, i.e., the linear field control motor of the present invention is not limited to use with electrically powered motor vehicles. In this connection, although the linear field control motor of the present invention has been depicted as being embodied in an electrically powered automobile, it is to be understood that the subject linear field control motor is also employable without departing from the essence of the invention in other forms of electrically powered motor vehicles such as for instance electrically powered motorcycles. Moreover, although the principle of cooperatively associating a linearly movable member with a revolving member has been described in the context of this application to electric motors, it is also to be understood that the same principle can in addition be applied to electric generators. When applied in the latter manner, the linearly movable member could be positioned either manually or automatically, and either through the use of mechanical or electromechanical means. Finally, although only one type of mechanism has been described hereinabove and illustrated in the drawings for effecting the linear movement of the linear field (LF) segment, there are many other mechanisms which could be employed for performing this same function such as for example mechanical, electromechanical, pneumatic or hydraulic means.

Thus, it can be seen that the present invention provides a novel and improved control system which is particularly suited for employment for purposes of effecting control over the electric motor embodied in an electrically powered motor vehicle which is operable therein as the prime mover thereof. Moreover, in accord with the present invention a control system has been provided which obviates the necessity of utilizing a multiplicity of control devices interposed between the electric motor and the batteries, while yet being operable to effect good speed control for electrically powered motor vehicles. The control system of the present invention is characterized in that it is capable of being maintained and repaired by odinarily trained electricians. Furthermore, in accord with the present invention a control system is provided which is readily capable of being economically mass produced by motor manufacturers without requiring any technical breakthroughs to be achieved by the latter in order to do so. Also, a control system is provided in accord with the present invention which is readily adapted through the performance of minor modifications thereto of being utilized in a variety of different applications. Finally, in accord with the present invention a control system is provided which is relatively inexpensive to manufacture and therefore is effective to assist in maintaining the cost of manufacture of the electrically powered motor vehicle which embodies the subject control system at a relatively low level.

Having thus described the invention, I claim:

1. In combination with a motor vehicle having a frame, a seat for a driver and a plurality of wheels, the combination therewith of
   A. a linear field control motor comprising:
      1. an output shaft operatively connected to at least one of said wheels of said motor vehicle for imparting drive thereto;
      2. support means operable for supporting the ends of said output shaft for rotation relative thereto;
      3. a revolving field segment including a revolvable member mounted on said output shaft intermediate the ends thereof for rotation therewith;
      4. electrical conductor means supported in the linear field control motor in operative engagement with said revolvable member, said electrical conductor means being operable to connect the linear field control motor in electrical circuit relation in an external electrical circuit;
      5. a linear field segment cooperatively associated with said revolving field segment, said linear field segment including a housing having an internal configuration complementary to the external configuration of said revolvable member and magnetic means mounted on the inner surface of said housing operable for producing a magnetic field capable of emcompassing said revolvable member therewithin;
      6. slide means supporting said linear field segment for linear movement relative to said revolvable member;
   B. means mounting said motor on said frame;
   C. a self-contained source of power on said frame providing direct current;
   D. circuit means between said power source and said motor; and
   E. actuator means operatively connected to said linear field segment for imparting movement thereto, said actuator means having at least a portion thereof accessible externally of said motor adjacent said driver seat, said actuator means being operable when actuated to cause said linear field segment to move relative to said revolvable member between a first position wherein said linear field segment is located in nonsurrounding relation to said revolvable member corresponding to the operating condition of the linear field control motor wherein the minimum horsepower is produced thereby and a second position wherein said linear field control motor encircles said revolvable member corresponding to the operating condition of the linear field control motor wherein the maximum horsepower is produced thereby, said actuator means including throttle means comprising in part said externally accessible portion and support means on said frame for said throttle means.

2. The linear field control motor as set forth in claim 1 wherein said revolvable member consists of an armature and a commutator cooperatively associated therewith, said armature comprising an iron core having a multiplicity of slots formed in the circumference thereof and a plurality of wires embedded within said multiplicity of slots.

3. The linear field control motor as set forth in claim 1 wherein said support means comprises a pair of spaced end bells, each of said pair of end bells being generally circular in configuration and having a through hole formed substantially at the center thereof for receiving therewithin a corresponding end of said output shaft.

4. The linear field control motor as set forth in claim 1 wherein said electrical conductor means comprises a pair of brushes and a pair of electrical conductors, said pair of brushes being mounted in the linear field control motor in spaced relation relative to each other and in sliding contact with the circumference of said revolvable member, said pair of electrical conductors each having one end thereof connected in electrical circuit relation with a corresponding one of said pair of brushes and the other end thereof being connectible in electrical circuit relation in an external electrical circuit.

5. The linear field control motor as set forth in claim 1 wherein said magnetic means comprises a pair of permanent magnets mounted in spaced opposed relation to each other on the inner surface of said housing.

6. The linear field control motor as set forth in claim 1 wherein said slide means comprises a multiplicity of elongated slide rails extending in parallel relation to each other so as to define an opening therebetween, each of said multiplicity of elongated slide rails having the opposite ends thereof secured to said support means.

7. The linear field control motor as set forth in claim 1 further comprising a first support block mounted on the exterior of said housing intermediate the ends thereof.

8. A linear field control motor particularly suited for employment in an electrically powered motor vehicle comprising:
   a. an output shaft operatively connected to the wheels of the electrically powered motor vehicle for imparting drive thereto;
   b. support means operable for supporting the ends of said output shaft for rotation relative thereto;
   c. a revolving field segment including a revolvable member mounted on said output shaft intermediate the ends thereof for rotation therewith;
   d. electrical conductor means supported in the linear field control motor in operative engagement with said revolvable member, said electrical conductor means being operable to connect the linear field control motor in electrical circuit relation in an external electrical circuit;
   e. a linear field segment cooperatively associated with said revolving field segment, said linear field segment including a housing having an internal configuration complementary to the external configuration of said revolvable member and magnetic means mounted on the inner surface of said housing operable for producing a magnetic field capable of encompassing said revolvable member therewithin;
   f. slide means supporting said linear field segment for linear movement relative to said revolvable member;
   g. a first support block mounted on the exterior of said housing intermediate the ends thereof; and h. actuator means operatively connected to said linear field segment for imparting movement thereto, said actuator means having at least a portion thereof externally accessible, said actuator means being operable when actuated to cause said linear field segment to move relative to said revolvable member between a first position wherein said linear field segment is located in nonsurrounding relation to said revolvable member corresponding to the operating condition of the linear field control motor wherein the minimum horsepower is produced thereby and a second position wherein said linear field control motor encircles said revolvable member corresponding to the operating condition of the linear field control motor wherein the maximum horsepower is produced thereby, said actuator means comprising a throttle cable having one end thereof secured to said first support block for limited movement relative thereto, a coil spring surrounding a portion of said throttle cable operable for causing said linear field segment to move from said second position thereof to said first position thereof, a throttle button supported on a surface of said first support block for movement between an unactuated condition and an actuated condition, and an end member fastened to said one end of said throttle cable for movement into and out of engagement with said throttle button for purposes of causing the actuation of said throttle button.

9. A linear field control motor particularly suited for employment in an electrically powered motor vehicle comprising:
   a. an output shaft operatively connected to the wheels of the electrically powered motor vehicle for imparting drive thereto;
   b. support means operable for supporting the ends of said output shaft for rotation relative thereto;
   c. a revolving field segment including a revolvable member mounted on said output shaft intermediate the ends thereof for rotation therewith;
   d. electrical conductor means supported in the linear field control motor in operative engagement with said revolvable member, said electrical conductor means being operable to connect the linear field control motor in electrical circuit relation in an external electrical circuit;
   e. a linear field segment cooperatively associated with said revolving field segment, said linear field segment including a housing having an internal configuration complementary to the external configuration of said revolvable member and magnetic means mounted on the inner surface of said housing operable for producing a magnetic field capable of encompassing said revolvable member therewith;
   f. slide means supporting said linear field segment for linear movement relative to said revolvable member;
   g. a first support block mounted on the exterior of said housing intermediate the ends thereof;
   h. a second support block mounted on said support means so as to be positioned on one side of said first support block;
   i. a third support block mounted on the exterior of said housing so as to be positioned on the other side of said first support block; and
   j. actuator means operatively connected to said linear field segment for imparting movement thereto, said actuator means having at least a portion thereof externally accessible, said actuator means being operable when actuated to cause said linear field segment to move relative to said revolvable member between a first position wherein said linear field segment is located in nonsurrounding relation to said revolvable member corresponding to the operating condition of the linear field control motor wherein the minimum horsepower is produced thereby and a second position wherein said linear field control motor encircles said revolvable member corresponding to the operating condition of the linear field control motor wherein the maximum horsepower is produced thereby.

10. The linear field control motor as set forth in claim 9 further comprising an air compressor having the ends thereof supported by said second and third support blocks, said air compressor being operable to suppress the speed of movement of said linear field segment.

* * * * *